United States Patent
Fleck et al.

(10) Patent No.: US 12,083,618 B2
(45) Date of Patent: Sep. 10, 2024

(54) SYSTEMS AND METHODS FOR LOAD CONTROL IN FRICTION STIR PROCESSING

(71) Applicant: Mazak Corporation, Florence, KY (US)

(72) Inventors: Rodney Dale Fleck, Provo, UT (US); Russell J. Steel, Provo, UT (US)

(73) Assignee: Mazak Corporation, Florence, KY (US)

( * ) Notice: Subject to any disclaimer, the term of this patent is extended or adjusted under 35 U.S.C. 154(b) by 0 days.

(21) Appl. No.: 17/972,152

(22) Filed: Oct. 24, 2022

(65) Prior Publication Data

US 2024/0131614 A1    Apr. 25, 2024
US 2024/0227062 A9    Jul. 11, 2024

(51) Int. Cl.
*B23K 20/00* (2006.01)
*B23K 20/12* (2006.01)
*B23K 103/10* (2006.01)

(52) U.S. Cl.
CPC ........ *B23K 20/1245* (2013.01); *B23K 20/123* (2013.01); *B23K 2103/10* (2018.08)

(58) Field of Classification Search
CPC ............................ B23K 20/125; B23K 20/123; B23K 20/1245; B23K 20/1255; B23K 20/122; B23K 20/1205; B23K 20/12; B23K 11/255
See application file for complete search history.

(56) References Cited

U.S. PATENT DOCUMENTS

| | | | | |
|---|---|---|---|---|
| 3,498,114 A | * | 3/1970 | Thomas | G01D 5/2258 73/661 |
| 5,718,366 A | * | 2/1998 | Colligan | B23K 20/125 228/2.1 |
| 8,052,028 B2 | * | 11/2011 | Hall | B23K 20/1265 228/2.1 |
| 10,343,232 B2 | * | 7/2019 | Lee | B23K 11/314 |
| 11,253,909 B2 | * | 2/2022 | Doyen | B25B 27/24 |
| 2003/0132201 A1 | * | 7/2003 | Kaeseler | B23K 11/253 219/86.41 |
| 2004/0195290 A1 | * | 10/2004 | Nagao | B23K 20/1265 228/2.1 |
| 2005/0178816 A1 | * | 8/2005 | Stevenson | B23K 20/127 228/2.1 |
| 2006/0032887 A1 | | 2/2006 | Haynie et al. | |

(Continued)

FOREIGN PATENT DOCUMENTS

GB    2174942 A    11/1986
WO    2016021538 A1    2/2016

OTHER PUBLICATIONS

CN108971744 English translation (Year: 2023).*

(Continued)

*Primary Examiner* — Erin B Saad
(74) *Attorney, Agent, or Firm* — RAY QUINNEY & NEBEKER P.C.; Paul N. Taylor

(57) ABSTRACT

A device for friction stirring a workpiece material includes a body, a spindle, a driver, and a biasing element. The spindle is configured to rotate around a rotational axis. The driver is rotationally coupled to the spindle. The biasing element supports the driver and is configured to apply a biasing force in an axial direction, wherein the biasing element axially overlaps the spindle.

18 Claims, 6 Drawing Sheets

(56) References Cited

U.S. PATENT DOCUMENTS

| | | | | |
|---|---|---|---|---|
| 2008/0006677 | A1* | 1/2008 | Kumagai | B23K 20/125 228/101 |
| 2008/0112768 | A1* | 5/2008 | Matlack | B23Q 3/16 408/1 BD |
| 2009/0308913 | A1* | 12/2009 | Hall | B23K 20/1265 228/112.1 |
| 2013/0221069 | A1* | 8/2013 | Saito | B23K 20/126 228/2.1 |
| 2014/0183245 | A1* | 7/2014 | Yamaguchi | B23K 20/127 228/2.1 |
| 2014/0248510 | A1* | 9/2014 | Sayama | B23K 20/2275 428/653 |
| 2015/0143686 | A1* | 5/2015 | Blacket | F16D 57/002 29/243.526 |
| 2016/0339506 | A1* | 11/2016 | Blacket | B21J 15/26 |
| 2018/0071860 | A1* | 3/2018 | Odakura | B23K 20/22 |
| 2018/0099349 | A1 | 4/2018 | Packer et al. | |
| 2019/0299325 | A1* | 10/2019 | Landmark | B23K 20/125 |
| 2022/0048131 | A1 | 2/2022 | Wenning et al. | |
| 2022/0126394 | A1* | 4/2022 | Ishiguro | B23K 20/125 |

OTHER PUBLICATIONS

International Search Report and Written Opinion received in PCT Application No. PCT/US2023/077646, mailed Mar. 15, 2024, 11 pages.

Invitation to Pay Additional Fees received in PCT Application No. PCT/US2023/077646, mailed Jan. 8, 2024, 2 pages.

* cited by examiner

SYSTEMS AND METHODS FOR LOAD CONTROL IN FRICTION STIR PROCESSING

CROSS-REFERENCE TO RELATED APPLICATIONS

N/A

BACKGROUND

Friction stir processing ("FSP") of metals has been used to attach weldable materials to one another in a solid-state joining process. FSP uses the motion of a pin pressed against the surface of a weldable material to generate heat and friction to move the weldable material. The material can plasticize and physically stir together with a second material to which the first material is joined. A pin, a pin and shoulder, or another "FSP tool" may be rotated in contact with a workpiece. A force is applied to the FSP tip to urge the FSP tool against the workpiece. The FSP tool is moved along the workpiece to stir the material of the workpiece. The physical process of mixing material from two plates joins the plates.

FSP joins weldable materials in a solid-state process that avoids many of the potential defects of other welding processes. For example, FSP produces a stirred region along the path of the tool that is generally indistinguishable from the original material. FSP may be performed without the inclusion of an additional material or use of shield gasses. Some welding methods, such as metal-inert gas ("MIG") welding, may introduce an additional material to create a bond. Other welding methods, such as tungsten-inert gas ("TIG") welding, may use a non-consumable contact point to heat one or more workpieces. However, the heating may cause the one or more workpieces to attain a liquid phase and risk a phase change in the one or more workpieces. A phase change may compromise the integrity of the bond and, potentially, the workpiece, itself. To limit the possibility of a phase change or other reaction, TIG welding and similar processes utilize an inert gas "shield" around the contact area.

Conventional FSP requires precision load measurement and adjustment of load application or precise depth position control to achieve FSP without defects, excess flash, or gaps in the friction stir zone.

SUMMARY

In some embodiments, a device for friction stirring a workpiece material includes a body, a spindle, a driver, and a biasing element. The spindle is configured to rotate around a rotational axis. The driver is rotationally coupled to the spindle. The biasing element supports the driver and is configured to apply a biasing force in an axial direction, wherein the biasing element axially overlaps the spindle.

In some embodiments, a system for friction stir processing includes a support arm including at least one joint and a friction stir processing device positioned at an end of the support arm. The friction stir processing device includes a body, a spindle, a driver, and a biasing element. The spindle is configured to rotate around a rotational axis. The driver is rotationally coupled to the spindle. The biasing element supports the driver and is configured to apply a biasing force in an axial direction, wherein the biasing element axially overlaps the spindle.

In some embodiments, a method of friction stir processing includes applying an axial force to a workpiece with a bit; rotating the bit relative to the workpiece with a tool holder; translating the bit through a stirred zone of the workpiece; compressing a biasing element in a body of the tool holder; and, while translating the bit through a stirred zone of the workpiece, moving the bit in a z-direction based at least partially on a biasing force and a change in a height of a surface of the workpiece.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, other drawings should be considered as drawn to scale for example embodiments. Understanding that the drawings depict some example embodiments, the embodiments will be described and explained with additional specificity and detail through the use of the accompanying drawings in which:

FIG. 4-1 through 4-3 are side views of a dynamic tool holder reacting to variations in a workpiece, according to some embodiments of the present disclosure;

DETAILED DESCRIPTION

This disclosure generally relates to devices, systems, and methods for increasing efficiency of a friction stir processing (FSP) tool for friction stir welding, joining, processing, or other friction stirring procedures. More specifically, some of the embodiments described herein relate to the design, manufacture, and use of FSP tools that provide a dynamic load on the FSP bit without user intervention or adjustment. For example, a FSP tool may be used to friction stir one or more workpieces for material processing or joining on an uneven or non-planar workpiece without intervention or adjustment for the surface imperfections or variations.

In some embodiments, the FSP bit has a conical (including frusto-conical), curved, or other non-cutting tip. The tip of the FSP bit may be plunged into a workpiece with an axial force that displaces workpiece material from the stirred region of the workpiece and/or joint. In some embodiments, a holder of the FSP tool includes one or more cutting elements to cut or otherwise remove flash from the surface of the workpiece around the stirred region. In other embodiments, the holder includes one or more burnishers to compress and/or burnish a surface of the workpiece around the stirred region.

In some embodiments, the penetration of the FSP bit by displacement of workpiece material instead of cutting into the workpiece material may produce greater amounts of movement of the workpiece material. In some examples, the FSP tool may produce thermal energy upon displacement in addition to the rotation of the FSP tool in contact with the workpiece. The FSP tool may then frictionally drag the workpiece material to flow the workpiece material in substantially circular motion with the rotation of the FSP tool work surface. In other examples, the FSP tool includes one or more surface features on a pin and/or a shoulder that mechanically engage with the workpiece material to flow the workpiece material. The increased flow rate may produce a stronger weld and/or allow increased translational speeds across the workpiece surface to complete a weld in less time.

Figure 1:
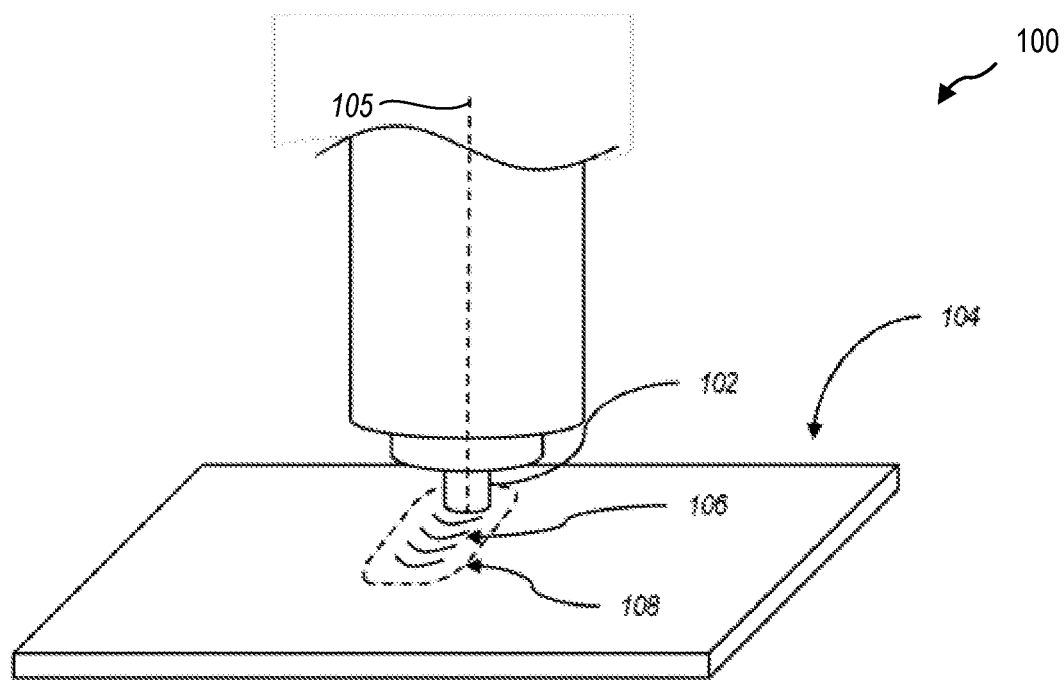
FIG. 1 is a perspective view of a friction bit joining system, according to some embodiments of the present disclosure.

FIG. 1 illustrates an embodiment of a FSP system 100 with a FSP tool 102 in contact with a workpiece 104. Rotation of the FSP tool 102 around a rotational axis 105 in contact with the workpiece 104 may stir the workpiece 104 in a stirred zone 106 and create a heat affected zone 108 beyond the stirred zone 106. In some embodiments, FSP stirs a workpiece 104 to refine the grain structure in the stirred zone FSP and/or the heat affected zone FSP of the workpiece material. For example, the crystalline structural of the workpiece material may be at least partially dependent on the manufacturing of the workpiece. The as-manufactured grain structure may be undesirable for a finished part. In some embodiments, FSP processes one or more workpieces with a reusable bit. In some embodiments, a consumable bit is used in the FSPing of one or more workpieces.

In some examples, a cast workpiece has a random orientation (i.e., no texture) with a relatively large grain size with little to no deformation within each grain. FSP of the cast aluminum may refine the grain size to produce a smaller average grain size (increasing the boundary density of the microstructure). FSP of the cast aluminum may further produce internal strain within the grains. Increases in one or both of the grain boundary density and the internal strain may increase the hardness of the aluminum.

In other examples, an extruded or rolled workpiece exhibits a preferred orientation to the grain structure (e.g., a <101> texture or a <001> texture, respectively in aluminum) that may be undesirable in the finished part. For example, an extruded texture in an aluminum rod may increase the mechanical wear rate of the aluminum when used as an axle. FSP of the aluminum may mechanically alter the grain structure of the aluminum rod and/or remove the extruded texture of the rod surface. Orientation textures may affect other mechanical or chemical properties of the workpiece, such as anisotropic hardness or toughness, or oxidation rates.

Figure 2:
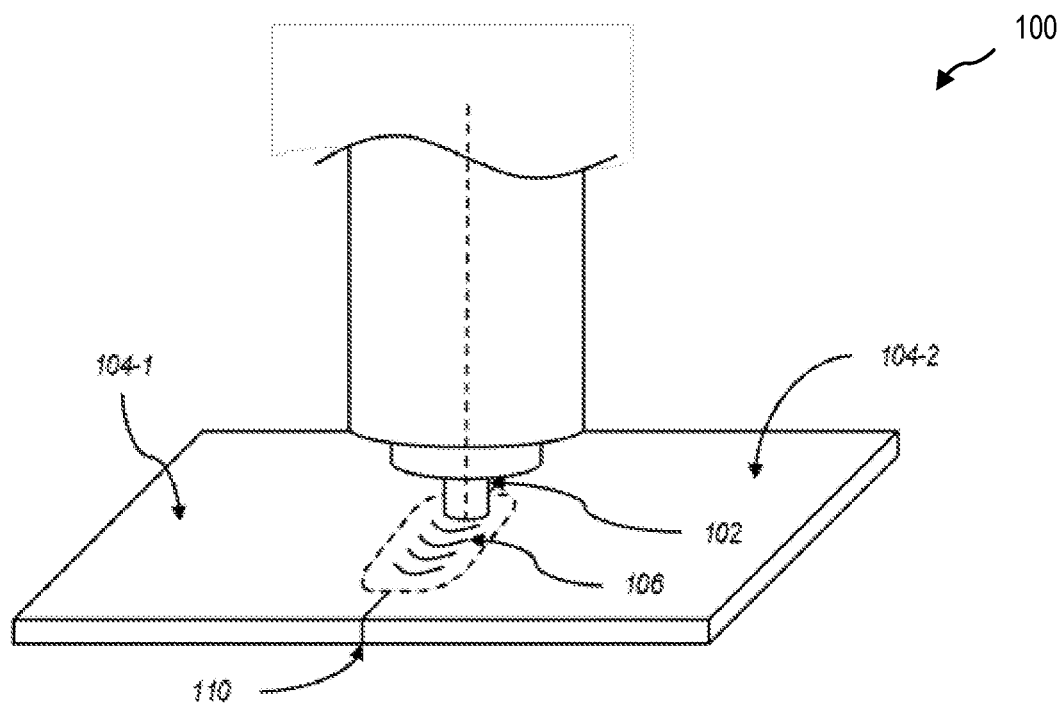
FIG. 2 is a is a perspective view of a friction bit joining system welding a butt joint, according to some embodiments of the present disclosure.

In other embodiments, FSP refers to friction stir welding of a first workpiece to a second workpiece. For example, FIG. 2 illustrates the FSP system 100 and FSP tool of FIG. 1 stir welding a butt joint. A first workpiece 104-1 may be positioned contacting a second workpiece 104-2 in a butt joint 110, and the first workpiece 104-1 and second workpiece 104-2 may be joined along the butt joint 110 by FSP. The FSP tool 102 may flow first workpiece material and second workpiece material in a circular direction and perpendicular to the butt joint 110 in the stirred zone 106 to transfer material between the first workpiece 104-1 and second workpiece 104-2, mechanically joining the first workpiece 104-1 and second workpiece 104-2 along the butt joint 110.

Stir welding is a solid-state joining process that plastically moves material of the first workpiece 104-1 and second workpiece 104-2 to interlock the first workpiece 104-1 and second workpiece 104-2 at a microstructural level. In some embodiments, the first workpiece 104-1 and second workpiece 104-2 are the same material. For example, the first workpiece 104-1 and the second workpiece 104-2 may be both a AA 6065 aluminum alloy. In other embodiments, the first workpiece 104-1 and second workpiece 104-2 are different materials. For example, the first workpiece 104-1 may be a single-phase aluminum alloy, and the second workpiece 104-2 may be a single-phase copper alloy. In other examples, the first workpiece 104-1 is an AA 6063 aluminum alloy and the second workpiece 104-2 is an AA 7075 aluminum alloy.

Figure 3:
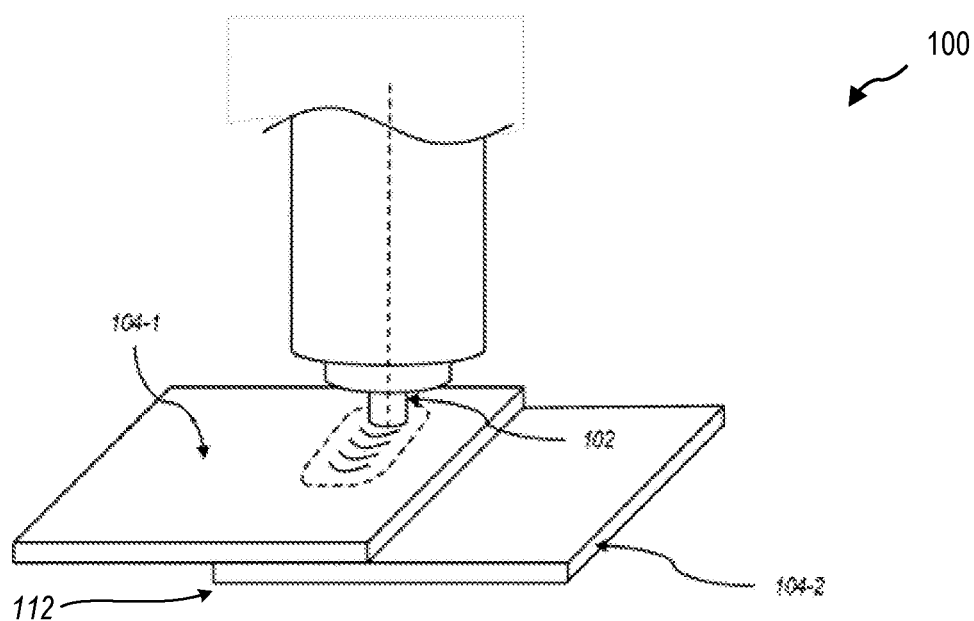
FIG. 3 is a perspective view of a friction bit joining system welding a lap joint, according to some embodiments of the present disclosure.

In yet another embodiment, stir welding by FSP includes friction stirring of a first workpiece and a second workpiece adjacent one another in a lap joint, such as the embodiment illustrated in FIG. 3. The FSP tool 102 may be positioned contacting a surface of the first workpiece 104-1 and the FSP tool 102 may be plunged into the first workpiece 104-1 and, optionally, the second workpiece 104-2 to plastically move first workpiece material and second workpiece material to interlock the first workpiece 104-1 and the second workpiece 104-2 at the lap joint 112.

In some embodiments, a lap joint 112 weld by FSP may require greater axial loads than a butt joint weld. The increased axial load may generate greater thermal energy and greater flow of material when a non-cutting FSP bit is used to displace workpiece material.

The axial compression force downward toward the workpieces 104-1, 104-2 may be in a range having an upper value, a lower value, or upper and lower values including any of 1,000 lbs. (4.45 kN), 2,000 lbs. (8.90 kN), 4,000 lbs. (17.8 kN), 6,000 lbs. (26.7 kN), 8,000 lbs. (35.6 kN), 10,000 lbs. (44.5 kN), 15,000 lbs. (66.8 kN), 20,000 lbs. (89.0 kN), greater than 20,000 lbs. (89.0 kN), or any values therebetween. For example, the axial force may be greater than 1,000 lbs. (4.45 kN). In other examples, the axial force may be less than 20,000 lbs. (89.0 kN). In yet other examples, the axial force may be between 1,000 lbs. (4.45 kN) and 20,000 lbs. (89.0 kN). In further examples, the axial force may be between 1,000 lbs. (4.45 kN) and 10,000 lbs. (44.5 kN). In at least one example, the axial force may be between 3,750 lbs. (16.7 kN) and 4,250 lbs. (18.9 kN), and in a particular embodiment is 4,000 lbs. (17.8 kN).

In some embodiments, the bit 114 includes or is made of a ferrous alloy, such as tool steel, a nickel alloy (e.g., a nickel superalloy), an aluminum alloy (e.g., AA 6065), or any other material that is metallurgically compatible with the workpiece to which the FSP bit 114 is intended to interact. For example, the bit 114 may be metallurgically compatible with both workpieces 104-1, 104-2 in a butt joint. In other examples, the bit 114 is metallurgically compatible with the bottom workpiece (i.e., the second workpiece 104-2) in a lap joint 112. In some embodiments, the bit 114 has one or more coatings to improve the metallurgical compatibility of the bit 114 and the workpiece(s) 104-1, 104-2. In other embodiments, the bit 114 has one or more coatings to improve the erosion and/or wear resistance of the bit 114. In yet other embodiments, the bit 114 has one or more coatings to improve the corrosion resistance of the bit 114.

In some embodiments, the displacement of workpiece material from the workpieces 104-1, 104-2 at the lap joint 112 disturbs and flow workpiece material within the stirred zone 106 even before any rotation of the bit 114 and stirring of the workpiece material. Hence, penetration of the bit 114 by displacement, in contrast to cutting, may allow for greater total movement of workpiece material, increasing the homogeneity and strength of the resulting welds.

The geometry of the bit 114 (including the pin 118, the shoulder(s) 120, or other working surfaces of the bit 114) may affect the axial force with which the bit 114 is forced toward the workpiece(s) 104-1, 104-2 during FSP. The axial force applied will ensure the bit 114 will plunge into the workpieces 104-1, 104-2 and displace material during FSP. For the FSP to complete with minimal or no defects, the axial force should be approximately constant such that the penetration depth of the bit 114 in the workpieces 104-1, 104-2 is approximately constant.

Figures 1, 4:
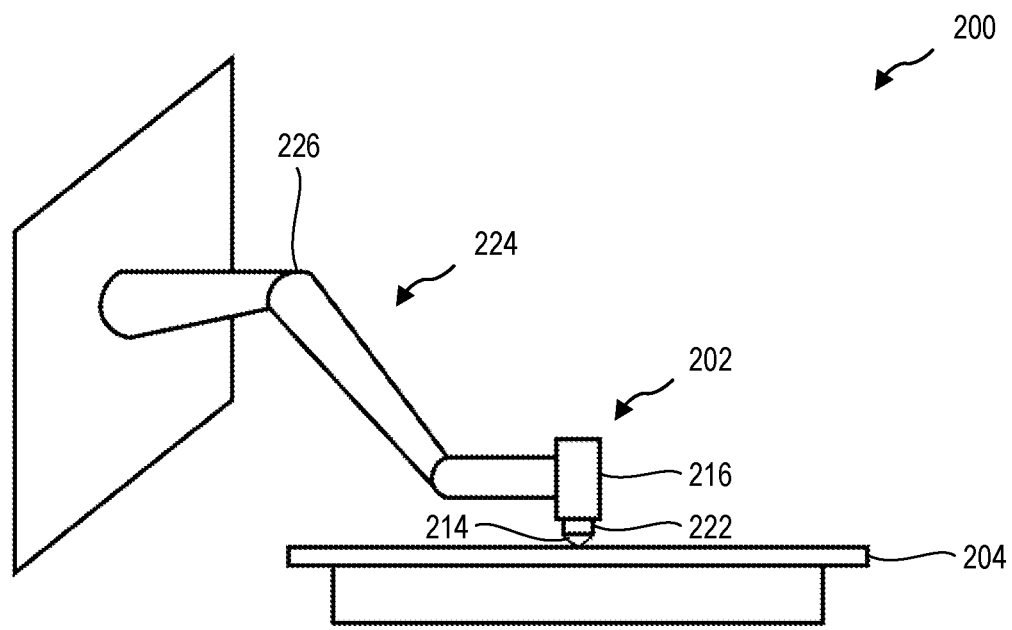
Figures 2, 4:
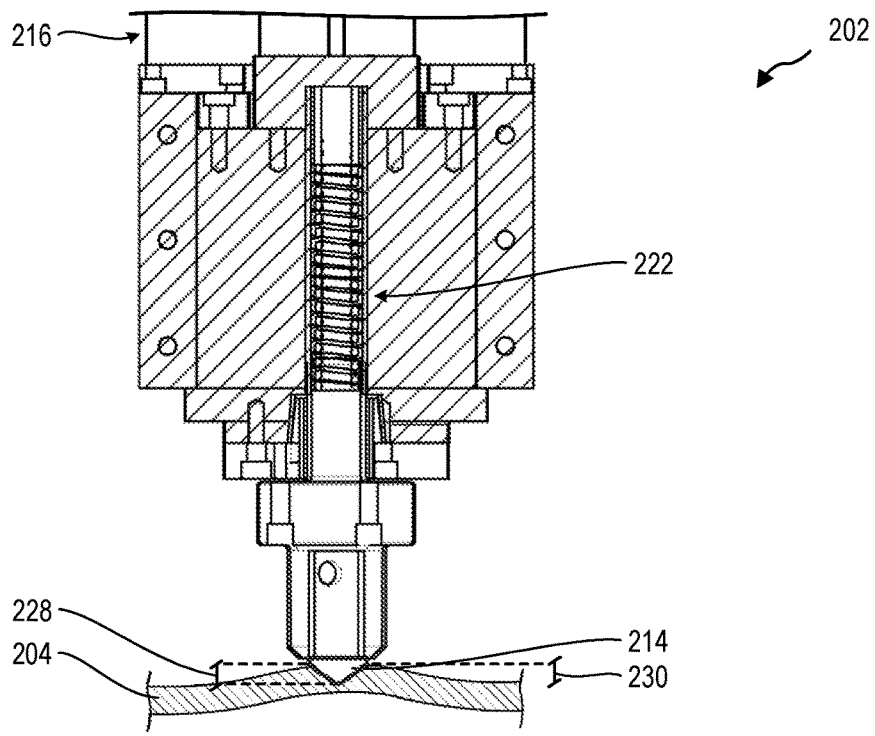
Figures 3, 4:
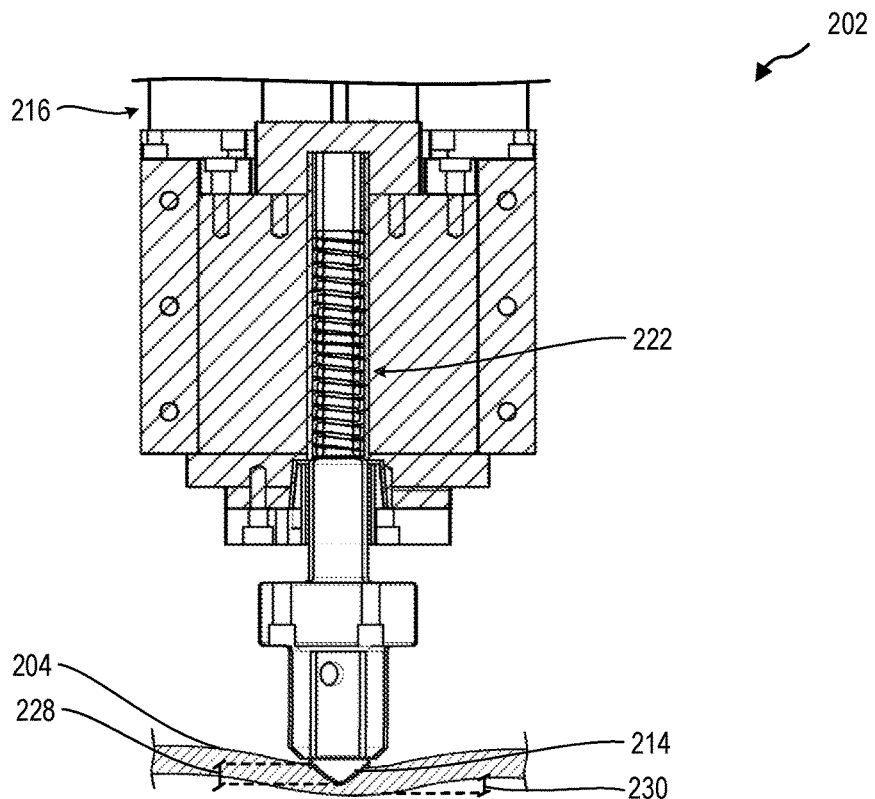

Referring now to FIG. 4-1 through 4-3, in some embodiments, the holder 216 includes a dynamically responsive biasing element 222. The biasing element 222 responds to the axial load applied to the bit 214. In some embodiments, the biasing element 222 compresses in response to a compression force between the bit 214 and the workpiece 204. The biasing element 222 applies an equal and opposite balancing force that urges the bit 214 toward the workpiece 204. By compressing, the biasing element 222 limits changes in axial load due to variations or imperfections in the workpiece surface. In some embodiments, the biasing element 222 includes a coil spring such as a die spring. In some embodiments, the biasing element 222 includes a gas piston-and-cylinder. It should be understood that while a single workpiece 204 is illustrated and described in relation to FIG. 4-1, the workpiece 204 may be or include a plurality of workpieces, such as in a lap joint, butt joint, or other joining process.

In some embodiments, an FSP system 200 includes a support arm 224 that positions the tool 202 at or against the workpiece 204. The support arm 224 may be part of a computer-controlled and/or computer numerical control (CNC) system that allows a user to position and/or move the tool 202 with a high degree of precision and repeatability. However, some support arms 224 have backlash in the motors and/or joints 226 of the support arm 224 that can introduce error or uncertainty in the position of the bit 214 at the terminal end of the tool 202. Additionally, curved workpiece surfaces can present additional challenges to the precise position of the tool 202 relative to the workpieces surfaces as the FSP system 200 moves the bit 214 along the workpiece surface. For example, the backlash or other variations in the positioning of the support arm 224 can limit the precision of the tool 202 location in three or six degrees-of-freedom. In other examples, the dimensions and geometry of the workpiece surface may not be known to a sufficiently high precision to map the movement of the bit 214 to the workpiece surface. In at least one example, a non-planar workpiece may be more challenging to secure and/or support in the FSP system 200, such as with an anvil surface on a back surface of the workpiece, and the workpiece itself may deform downward in response to the axial force of the bit 214 in a macro-scale outside of the stirred zone and/or heat-affected zone.

As small changes in the z-position (e.g., depth) of the bit 214 in the workpiece 204 can produce undesirable changes, the biasing element 222 in the tool 202 can provide a buffer component that reduces changes in axial force relative to changes in the z-position of the holder. In some embodiments, the biasing element 222 has a stroke in which the bit 214 is axially moveable relative to a body of the holder 216. In some embodiments, the biasing element 222 adheres or substantially adheres to Hooke's Law within the stroke. In a conventional system, a change of 1 millimeter (mm) of z-position of the tool 202 relative to the workpiece surface may result in a change of bit depth of 1 mm into the workpiece surface, potentially producing defects. In at least some embodiments of the present disclosure, a change of 1 mm of z-position of the holder 216 relative to the workpiece surface changes an axial force on the bit that balances the force applied by the workpiece on the bit. In a particular example, a 1 mm change in a z-position may increase the axial force applied to the bit 214 by 1,000 lbs. (4.45 kN), which may produce a change in bit depth of less than 1 mm.

Depending on the spring constant of the biasing element 222 in the tool 202, the relationship between the displacement of the bit 214 relative to the holder 216 and the change in the axial force applied by the bit 214 is adjustable. In some embodiments, the biasing element includes a spring (e.g., a coil spring such as a die spring), a compressible solid (such as a polymer bushing), a compressible liquid or gas in a piston-and-cylinder, a magnet (such as an electromagnet), or combinations thereof. In some examples, the spring may be a coil spring, a die spring, one or more Belleville springs, one or more leaf springs, or combinations thereof. In some embodiments, the spring has a single spring constant throughout a stroke of the biasing element. In some examples, the spring may be a progressive spring that has regions that exhibit different spring constants within a stroke of the biasing element. In some embodiments, the biasing element includes a first biasing element and a second biasing element in axial series with one another, where the first biasing element has a first spring constant and the second biasing element has a second spring constant. A second spring constant that is greater than the first spring constant may allow the bit to move relative to a driver with less risk of the biasing element fully compressing and damaging the biasing element or other portion of the tool 202.

FIG. 4-2 is a detail side cross-sectional view of the tool 202 of FIG. 4-1 friction stir welding a portion of the workpiece 204 with a non-planar surface that compresses the biasing element 222. In some embodiments, a variation in the surface of the workpiece 204 applies a compressive force to the bit 214 without the support arm 224 (such as described in relation to FIG. 4-1) moving the tool 202. The biasing element 222 of the tool 202 can compress, allowing the bit 214 to move and at least partially follow the workpiece surface in the axial direction to limit and/or prevent defects in the FSP due to the variations in the workpiece surface. In some embodiments, the biasing element 222 compresses without an increase in the bit depth 228 in the workpiece 204, allowing the bit 214 to follow the workpiece surface in the axial direction.

In some embodiments, the biasing element 222 compresses and, while the bit depth 228 in the workpiece 204 increases due to the increased axial force based on the spring constant of the biasing element 222, the bit depth 228 increases less than the height 230 of the variation in the workpiece surface. For example, the workpiece surface may change in height 230 in the axial direction of the tool 202 by 1 mm and the change in bit depth 228 may be less than 1 mm. A tool 202 with a biasing element 222 according to the present disclosure can, thereby, limit and/or prevent defects due to displacements between the workpiece surface and the tool 202.

FIG. 4-3 is a detail side cross-sectional view of the tool 202 of FIG. 4-1 friction stir welding a portion of the workpiece 204 with a non-planar surface that extends the biasing element 222. In some embodiments, a variation in the surface of the workpiece 204 reduces a compressive force to the bit 214 without the support arm 224 (such as described in relation to FIG. 4-1) moving the tool 202. The biasing element 222 of the tool 202 can extend, allowing the bit 214 to move and at least partially follow the workpiece surface in the axial direction to limit and/or prevent defects in the FSP due to the variations in the workpiece surface. In some embodiments, the biasing element 222 extends without a decrease in the bit depth 228 in the workpiece 204, allowing the bit 214 to follow the workpiece surface in the axial direction.

In some embodiments, the biasing element 222 extends and, while the bit depth 228 in the workpiece 204 decreases due to the reduced axial force based on the spring constant of the biasing element 222, the bit depth 228 decreases less than the height 230 of the recess in the workpiece surface. For example, the workpiece surface may change in height 230 in the axial direction of the tool 202 by 1 mm and the change in bit depth 228 may be less than 1 mm. A tool 202 with a biasing element 222 according to the present disclosure can, thereby, limit and/or prevent defects due to displacements between the workpiece surface and the tool 202.

Figure 5:
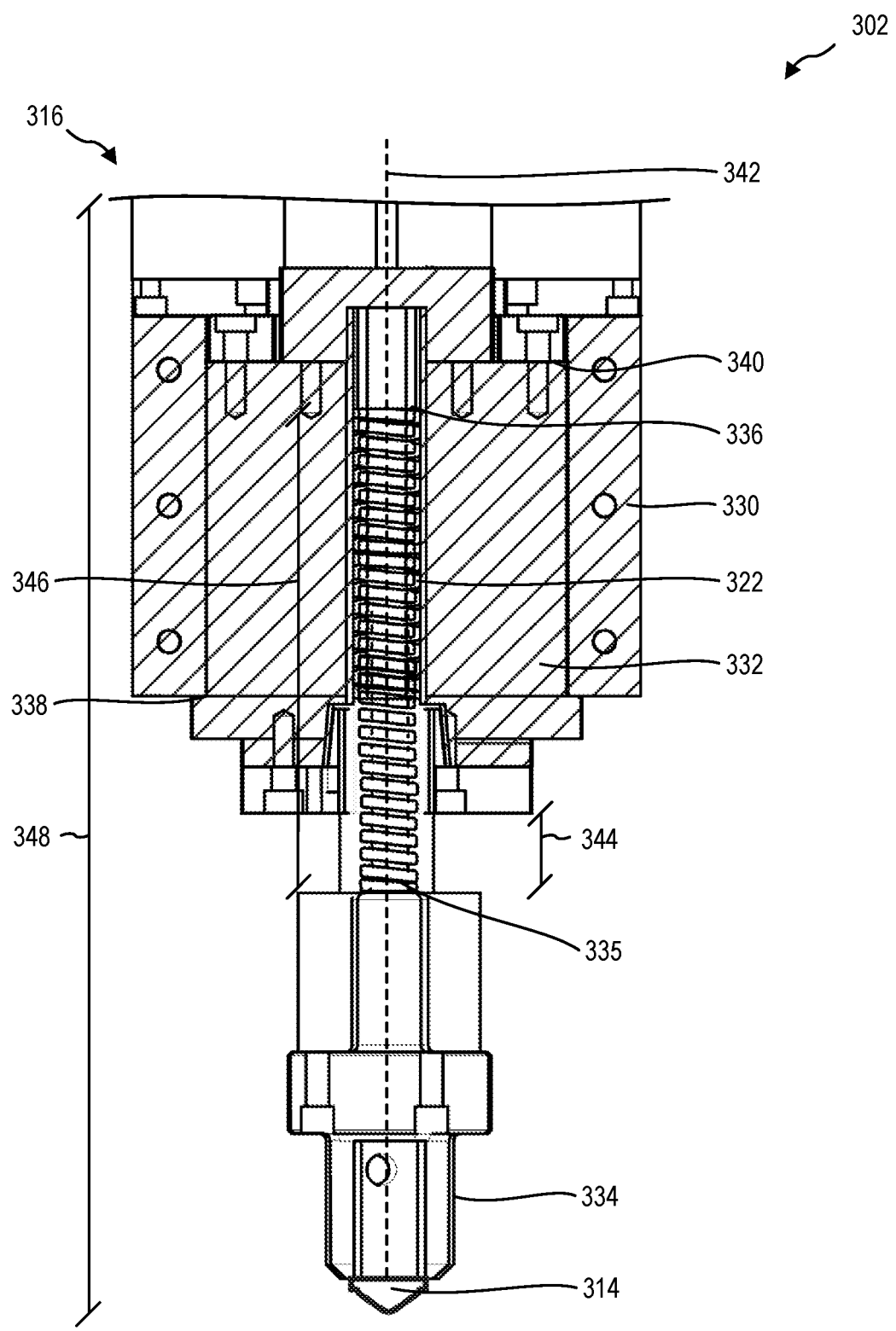
FIG. 5 is a side cross-sectional view of a device for friction stir processing, according to some embodiments of the present disclosure.

FIG. 5 is a side cross-sectional view of a tool 302, according to at least some embodiments of the present disclosure. In some embodiments, the tool 302 includes a bit 314 and a holder 316, wherein the holder 316 includes a body 330 through which a spindle 332 passes. The spindle 332 is configured to rotate relative to the body 330 and rotate the bit 314. In some embodiments, the holder 316 supports a driver 334 positioned at the distal end of the spindle 332, which supports the bit 314. The driver 334 is axially supported by the biasing element 322. The driver 334 is rotationally coupled to the spindle 332. In some embodiments, the biasing element 322 is rotationally fixed to the spindle 332 and rotates relative to the body 330. In some embodiments, the biasing element 322 is rotationally fixed relative to the body 330 and the spindle 332 rotates relative to the biasing element 322. In some embodiments, the biasing element 322 is not rotationally fixed to either of the body 330 or the spindle 332, and the biasing element 322 is free to rotate relative to the body 330 and the spindle 332. For example, the biasing element 322 may have a race bearing or bearing surface between the biasing element 322 and the body 330 and/or between the biasing element 322 and the spindle 332. During high rotational speeds, two bearings/bearing surfaces may distribute heat and wear to increase an operational lifetime of the tool 302.

In some embodiments, the biasing element 322 is located at least partially axially overlapping the spindle 332. For example, at least one of a distal end 335 of the biasing element 322 and a proximal end 336 of the biasing element 322 is axially between a distal spindle end 338 and a proximal spindle end 340 in the axial direction. In some embodiments, the biasing element 322 is located completely axially overlapping the spindle 332. For example, both of a distal end 335 of the biasing element 322 and a proximal end 336 of the biasing element 322 are axially between a distal spindle end 338 and a proximal spindle end 340 in the axial direction.

In some embodiments, the biasing element 322 is coaxial with the rotational axis 342 of the spindle 332. In some examples, a spring of the biasing element is positioned angularly surrounding the spindle 332. In some examples, the spindle 332 angularly surrounds a spring of the biasing element 322. In some examples, a compressible material is positioned in an annulus around the spindle 332. In some examples, the spindle 332 is an annulus around the biasing element 322. In other embodiments, a plurality of biasing elements 322 are positioned around or within the spindle 332. In some embodiments, the biasing element 322 is rotationally symmetrical around or within the spindle 332 (e.g., rotationally symmetrical around the rotational axis 342). For example, the biasing element 322 is substantially uniform in a rotational direction around the rotational axis 342.

In contrast to a conventional spring-loaded tool holder, a biasing element according to the present disclosure axially overlaps the spindle. A conventional spring-loaded tool holder connects to the distal end of a spindle, adding axial length to the overall tool, and limiting the applications, workpieces, and systems with which the conventional spring-loaded tool holder can work. A tool 302 according to some embodiments of the present disclosure can shorten the total length 348 of the tool 302 by axially overlapping the biasing element 322 with the spindle 332. In some embodiments, the stroke 344 of the biasing element 322 is less than a biasing element length 346. For example, the biasing element length 346 may be the axial length of a spring of the biasing element 322 or an axial length of the chamber of compressible gas in a piston-and-cylinder. In some embodiments, as the biasing element approaches complete compression (e.g., bottoming out), the biasing element 322 may not exhibit a response according to Hooke's law. In some embodiments, within the stroke 344, the biasing element 322 exhibits a response to that is substantially according to Hooke's law.

In some embodiments, the stroke 344 is less than 75% of the biasing element length 346. In some embodiments, the stroke 344 is less than 50% of the biasing element length 346. In some embodiments, the stroke 344 is less than 33% of the biasing element length 346. Because the biasing element 322, in some embodiments, is axially overlapping the spindle 332, the biasing element length 346 and/or the stroke 344 may be greater than a conventional spring-loaded tool holder. In some embodiments, the stroke 344 is greater than 15% of the biasing element length 346. In some embodiments, the stroke 344 is greater than 25% of the biasing element length 346. In some embodiments, the stroke 344 is greater than 50% of the biasing element length 346.

As described herein, a biasing element 322 according to the present disclosure can have a greater axial length than a conventional spring-loaded tool holder by axially overlapping the spindle 332. In some embodiments, the biasing element length 346 is no less than 2". In some embodiments, the biasing element length 346 is no less than 3". In some embodiments, the biasing element length 346 is no less than 4".

The stroke 344 may be greater relative to a total length 348 of the tool 302 and/or body 330 of the tool 302 than a tool holder with a conventional spring-loaded tool holder. In some embodiments, the stroke 344 is greater than 15% of the total length 348 of the tool 302. In some embodiments, the stroke 344 is greater than 25% of the total length 348 of the tool 302. In some embodiments, the stroke 344 is greater than 50% of the total length 348 of the tool 302.

Relative to a conventional spring-loaded tool holder, some embodiments of a tool 302 according the present disclosure experiences less torque during translation across a workpiece and may exhibit less lateral bending of the tool 302. The tool 302 experiences a force from the workpiece that resists the translation of the bit 314 through the workpiece. The shorter total length 348 of the tool 302 (compared to a conventional tool holder) can reduce the lever arm over which the force is applied, which can further improve the precision with which the position of the bit 314 is controlled. For example, a support arm of a CNC machine or other robotic system such as described in relation to FIG. 4-1 can experience bending or other elastic deformation of the support arm. The farther the location of the applied force from the support arm and/or joints of the support arm, the greater the potential for deformation and/or error in the bit 314 placement. A more compact device can improve precision and accuracy with an FSP system.

In some embodiments, the biasing element 322 may be preloaded to limit the amount of compression of the biasing element 322 that is needed to achieve operational axial forces. For example, a tool 302 that is intended for FSP under axial forces of 2,000 lbs. (8.90 kN) to 10,000 lbs. (44.5 kN) may have a preload of the biasing element of 2,000 lbs. (8.90 kN). In such an example, an axial force applied to the workpiece that is less than the preload would not produce any compression of the biasing element 322, and the bit 314 remains in the same axial position relative to the body 330. As the FSP system applies greater force to the workpiece, the bit 314 may displace axially relative to the body 330, allowing both compression and extension of the biasing element 322 during FSP of the workpiece. In some embodiments, the preload of the biasing element 322 is in a range having an upper value, a lower value, or upper and lower values including any of 1,000 lbs. (4.45 kN), 2,000 lbs. (8.90 kN), 4,000 lbs. (17.8 kN), 6,000 lbs. (26.7 kN), 8,000 lbs. (35.6 kN), 10,000 lbs. (44.5 kN), 15,000 lbs. (66.8 kN), 20,000 lbs. (89.0 kN), greater than 20,000 lbs. (89.0 kN), or any values therebetween. For example, the preload may be greater than 1,000 lbs. (4.45 kN). In other examples, the preload may be less than 20,000 lbs. (89.0 kN). In yet other examples, the preload may be between 1,000 lbs. (4.45 kN) and 20,000 lbs. (89.0 kN). In further examples, the preload may be between 1,000 lbs. (4.45 kN) and 10,000 lbs. (44.5 kN). In at least one example, the preload may be between 3,750 lbs. (16.7 kN) and 4,250 lbs. (18.9 kN), and in a particular embodiment is 4,000 lbs. (17.8 kN).

In some embodiments, a sensor 349 measures an axial force applied to the bit 314. In some embodiments, the sensor 349 is a force sensor configured to measure the axial force directly. In some embodiments, the sensor 349 is a strain gauge configured to measure the axial force indirectly. In some embodiments, the sensor 349 is a displacement sensor configured to measure a displacement of at least a portion of the biasing element 322. For example, a displacement sensor may measure a compression and/or extension of the biasing element 322 to measure an axial force applied on the biasing element 322 by the bit 314.

Figure 6:
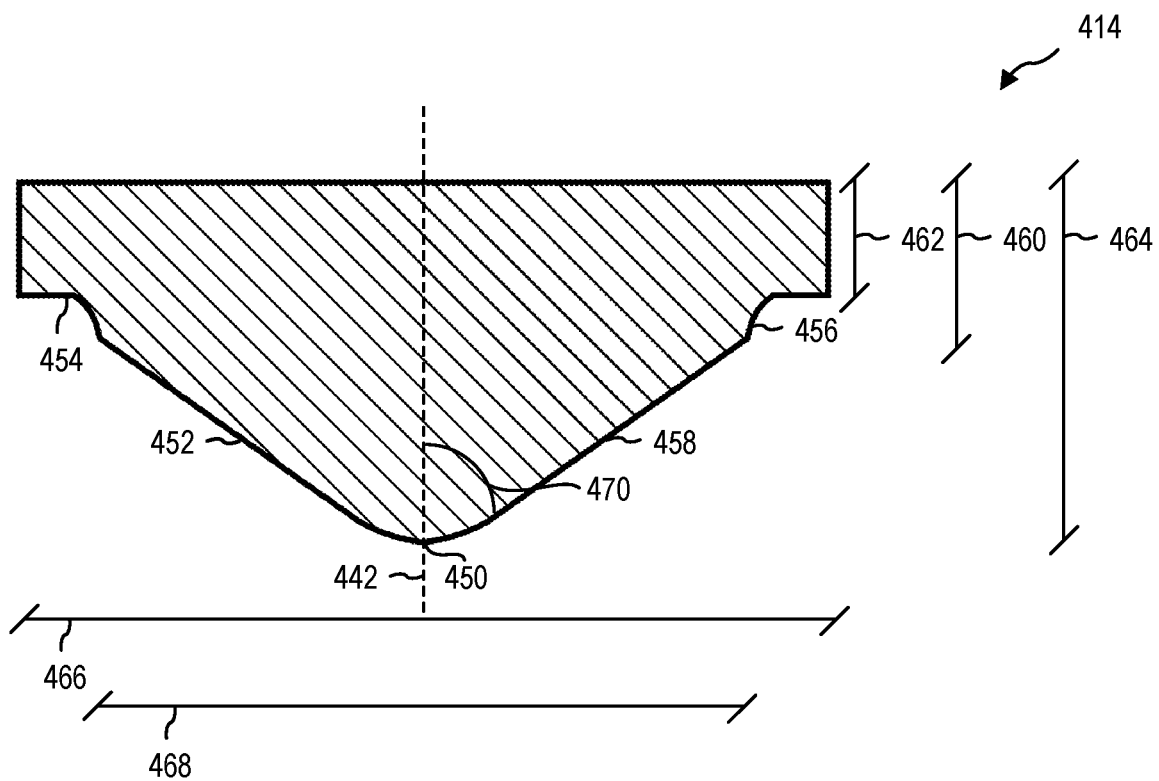
FIG. 6 is a side cross-sectional view of a bit for friction stir processing, according to some embodiments of the present disclosure.

FIG. 5 illustrates an embodiment of a bit 314 with a planar tip, other embodiments of a bit 414 such as illustrated in FIG. 6 have a non-planar tip 450. In some embodiments, the bit design and/or geometry can further allow the bit to follow a workpiece surface by limiting bit penetration and allowing the biasing element to compress.

In some embodiments, the bit 414 has a generally conical pin 452 and substantially flat shoulder 454. In the same or other embodiments, a curved transition 456 may be positioned between the pin 452 and the adjacent shoulder 454 to direct workpiece material flow to the shoulder 454. In other embodiments, the bit 414 has a pin 452 and lacks a shoulder 454. In yet other embodiments, the pin 452 has a face 458 with one or more surface features thereon to engage with the workpiece material and increase flow of the workpiece material around the bit 414.

In some embodiments, a pin 452 includes one or more surface features to increase the movement of workpiece material during rotation of the pin 452. For example, a pin 452 may have a spiral surface feature to urge material in the stirred zone to circulate toward the radial center of the stirred zone instead of displacing radially away from the FSP bit 414. Such a pin surface feature may be beneficial in a lap joint friction stir weld to reduce and/or prevent thinning of the workpiece material in the weld zone. The spiral pin surface feature in combination with the angle of a linear portion and/or curved portion of the pin profile, may circulate workpiece material downward toward within the stirred region, as well. Such a surface feature may be beneficial in a lap friction stir weld to encourage stirred workpiece material from the first workpiece toward the second workpiece to form the lap joint.

The pin 452 in FIG. 6 has a pin height 460 that is relative to the shoulder height 462. In some embodiments, the pin height 460 is a percentage of the shoulder height 462 in a range having an upper value, a lower value, or upper and lower values including any of 50%, 60%, 70%, 80%, 90%, 100%, 110%, 120%, 130%, 140%, 150%, greater than 150%, or any values therebetween. For example, the pin height 460 may be greater than 50% of the shoulder height 462. In other examples, the pin height 460 may be less than 150% of the shoulder height 462. In yet other examples, the pin height 460 may be between 50% and 150% of the shoulder height 462. In further examples, the pin height 460 may be between 75% and 125% of the shoulder height 462.

In some embodiments, the pin 452 has a pin height 460 that is relative to a bit height 464. The pin height 460 may be in a range having an upper value, a lower value, or an upper and lower value including any of 5%, 10%, 15%, 20%, 25%, 30%, 40%, 45%, 50%, 60%, 70%, 80%, 90%, 100% of the bit height 464, or any values therebetween. For example, the pin height 460 may be greater than 10% of the bit height 464. In another example, the pin height 460 may be greater than 25% of the bit height 464. In yet another example, the pin height 460 may be greater than 50% of the bit height 464.

In some embodiments, the pin 452 has a pin height 460 in the longitudinal direction that is relative to a total diameter 466 of the bit 414. In FIG. 6, the total diameter 466 is a maximum diameter of the bit 414. The pin height 460 may be in a range having an upper value, a lower value, or an upper and lower value including any of 5%, 10%, 15%, 20%, 25%, 30%, 40%, 45%, 50%, 60%, 70%, 80%, 90%, 100% of the total diameter 466, or any values therebetween. For example, the pin height 460 may be greater than 5% of the total diameter 466. In another example, the pin height 460 may be less than 100% of the total diameter 466. In yet another example, the pin height 460 may be between 10% and 50% of the total diameter 466. In at least one example, the pin height 460 may be between 15% and 35% of the total diameter 466.

In other embodiments, the bit 414 has a bit height 464 that is related to the total diameter 466. The bit height 464 may be in a range having an upper value, a lower value, or an upper and lower value including any of 5%, 10%, 15%, 20%, 25%, 30%, 40%, 45%, 50%, 60%, 70%, 80%, 90%, 100% of the total diameter 466, or any values therebetween. For example, the bit height 464 may be greater than 5% of the total diameter 466. In another example, the bit height 464 may be less than 100% of the total diameter 466. In yet another example, the bit height 464 may be between 10% and 50% of the total diameter 466. In a further example, the bit height 464 may be between 25% and 40% of the total diameter 466. In at least one specific example, the bit height 464 may be greater than 100% of the total diameter 466, such as when joining thick workpieces and/or the site of the FBJ placement has relatively small lateral clearance.

FIG. 6 illustrates a bit 414 with a tapered pin 452. In some embodiments, the pin 452 has a pin profile that is at least partially linear. In other embodiments, the pin 452 has a pin profile that is at least partially curved. In yet other embodiments, the pin 452 has a pin profile with a portion that is curved and a portion that is linear. For example, the embodiment of a pin 452 illustrated in FIG. 6 includes a pin profile with a curved transition 456 and a linear face 458.

The bit 414 may have a non-cutting tip 450 that allows the bit 114 to penetrate a workpiece by displacing workpiece material without cutting the workpiece material. In some embodiments, the bit 414 has a tip 450 that is rounded. In other embodiments, the tip 450 may be pointed. In yet other embodiments, the tip 450 is planar and the face 458 is optionally angled, such that the pin 452 is frustoconical. In further embodiments, the tip 450 is planar across a pin diameter 468, such that the pin 452 is substantially cylindrical. In at least one embodiment, the tip 450 includes at least one pilot feature to assist in engaging with and penetrating into the workpiece material.

In other embodiments, the tip 450 is a cutting tip that includes one or more cutting features to accelerate penetration into the workpiece material. The cutting features may cut a pilot hole with a diameter less than a pin diameter 468, such that the pin 452 displaces workpiece material radially outside the pilot hole. For example, the cutting features may cut a pilot hole with a diameter 50% of the pin diameter 468, and the face 458 of the pin 452 may displace workpiece material outside of the pilot hole.

In some embodiments, the pin 452 has a pin diameter 468 that is related to the total diameter 466 of the bit 414. For example, the pin diameter 468 may be a percentage of the total diameter 466 in a range having an upper value, a lower value, or an upper and lower value including any of 5%, 10%, 15%, 20%, 25%, 30%, 40%, 45%, 50%, 60%, 70%, 80%, 90%, 100%, or any values therebetween. For example, the pin diameter 468 may be greater than 5% of the total diameter 466. In another example, the pin diameter 468 may be less than 100% of the total diameter 466. In yet another example, the pin diameter 468 may be between 10% and 90% of the total diameter 466. In at least one example, the pin diameter 468 may be between 25% and 75% of the total diameter 466.

In some embodiments, the pin 452 has a face angle 470 between a face 458 of the pin 452 and the rotational axis 442 that is in a range having an upper value, a lower value, or upper and lower values including any of 30°, 40°, 45°, 50°, 60°, 75°, 80°, 85°, 90°, or any values therebetween. For example, a face 458 may be oriented at a face angle 470 greater than 30°. In other examples, the face 458 is oriented at a face angle 470 less than 90°. In yet other examples, the face 458 is oriented a face angle 470 between 30° and 90°. In further examples, the face 458 is oriented at a face angle 470 between 45° and 80°. In at least one example, the face 458 is oriented at a face angle 470 of 60° to the rotational axis 442. In at least another example, the face 458 is oriented at a face angle 470 that is non-perpendicular to the rotational axis 442.

Figure 7:
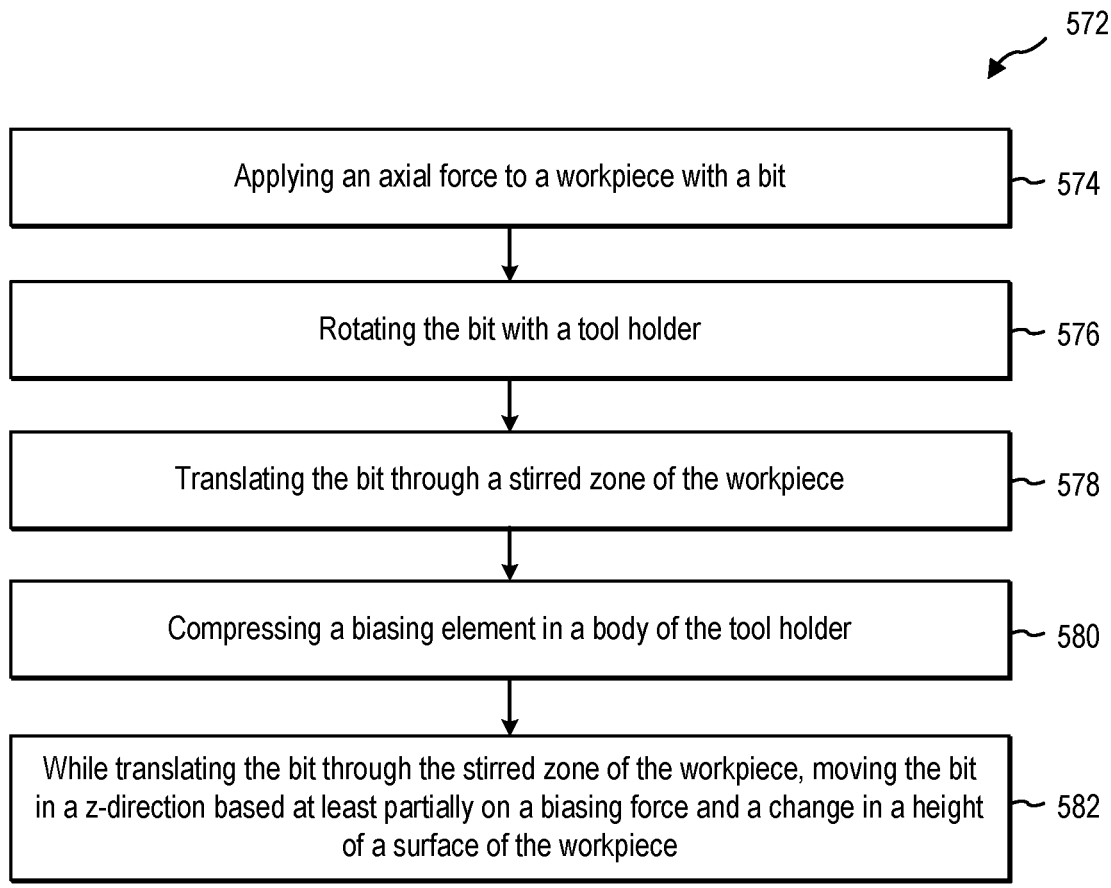
FIG. 7 is a method of friction stir processing, according to some embodiments of the present disclosure.

A method of FSP, in some embodiments according to the present disclosure, allows the bit to react to changes in the workpiece surface without the support arm or other device moving the tool holder in a z-direction relative to the workpiece. FIG. 7 illustrates an embodiment of a method 572 of FSP including applying an axial force to a workpiece with a bit at 574 and rotating the bit with a tool holder at 576, such as described herein. The bit may soften the workpiece and plunge into the workpiece before the method 572 includes translating the bit through a stirred zone of the workpiece (such as described in relation to FIG. 1 through 3) at 578.

In some embodiments, the method includes compressing a biasing element in a body of the tool holder at 580 to allow the axial force to change in response to the relative position of the tool holder and the workpiece surface. While translating the bit through the stirred zone of the workpiece, the method further includes moving the bit in a z-direction based at least partially on a biasing force of the biasing element and a change in a height of the workpiece surface, such as described in relation to FIG. 4-1 through 4-3. In some embodiments, moving the bit in a z-direction includes moving the bit relative to a body of the tool holder. For example, the biasing element may compress to allow the bit to move closer to the body of the tool and/or in a first z-direction. In some examples, the biasing element may extend to allow the bit to move further from the body of the tool and/or in a second z-direction.

INDUSTRIAL APPLICABILITY

This disclosure generally relates to devices, systems, and methods for increasing efficiency of a friction stir processing (FSP) tool for friction stir welding, joining, processing, or other friction stirring procedures. More specifically, some of the embodiments described herein relate to the design, manufacture, and use of FSP tools that provide a dynamic load on the FSP bit without user intervention or adjustment. For example, a FSP tool may be used to friction stir one or more workpieces for material processing or joining on an uneven or non-planar workpiece without intervention or adjustment for the surface imperfections or variations.

In some embodiments, the FSP bit has a conical (including frusto-conical), curved, or other non-cutting tip. The tip of the FSP bit may be plunged into a workpiece with an axial force that displaces workpiece material from the stirred region of the workpiece and/or joint. In some embodiments, a holder of the FSP tool includes one or more cutting elements to cut or otherwise remove flash from the surface of the workpiece around the stirred region. In other embodiments, the holder includes one or more burnishers to compress and/or burnish a surface of the workpiece around the stirred region.

In some embodiments, the penetration of the FSP bit by displacement of workpiece material instead of cutting into the workpiece material may produce greater amounts of movement of the workpiece material. In some examples, the FSP tool may produce thermal energy upon displacement in addition to the rotation of the FSP tool in contact with the workpiece. The FSP tool may then frictionally drag the workpiece material to flow the workpiece material in substantially circular motion with the rotation of the FSP tool work surface. In other examples, the FSP tool includes one or more surface features on a pin and/or a shoulder that mechanically engage with the workpiece material to flow the workpiece material. The increased flow rate may produce a stronger weld and/or allow increased translational speeds across the workpiece surface to complete a weld in less time.

In some embodiments, a FSP system with a FSP tool in contact with a workpiece. Rotation of the FSP tool around a rotational axis in contact with the workpiece may stir the workpiece in a stirred zone and create a heat affected zone beyond the stirred zone. In some embodiments, FSP stirs a workpiece to refine the grain structure in the stirred zone FSP and/or the heat affected zone FSP of the workpiece material. For example, the crystalline structural of the workpiece material may be at least partially dependent on the manufacturing of the workpiece. The as-manufactured grain structure may be undesirable for a finished part. In some embodiments, FSP processes one or more workpieces with a reusable bit. In some embodiments, a consumable bit is used in the FSPing of one or more workpieces.

In some examples, a cast workpiece has a random orientation (i.e., no texture) with a relatively large grain size with little to no deformation within each grain. FSP of the cast aluminum may refine the grain size to produce a smaller average grain size (increasing the boundary density of the microstructure). FSP of the cast aluminum may further produce internal strain within the grains. Increases in one or both of the grain boundary density and the internal strain may increase the hardness of the aluminum.

In other examples, an extruded or rolled workpiece exhibits a preferred orientation to the grain structure (e.g., a <101> texture or a <001> texture, respectively in aluminum) that may be undesirable in the finished part. For example, an extruded texture in an aluminum rod may increase the mechanical wear rate of the aluminum when used as an axle. FSP of the aluminum may mechanically alter the grain structure of the aluminum rod and/or remove the extruded texture of the rod surface. Orientation textures may affect other mechanical or chemical properties of the workpiece, such as anisotropic hardness or toughness, or oxidation rates.

In other embodiments, FSP refers to friction stir welding of a first workpiece to a second workpiece. A first workpiece may be positioned contacting a second workpiece in a butt joint, and the first workpiece and second workpiece may be joined along the butt joint by FSP. The FSP tool may flow first workpiece material and second workpiece material in a circular direction and perpendicular to the butt joint in the stirred zone to transfer material between the first workpiece and second workpiece, mechanically joining the first workpiece and second workpiece along the butt joint.

Stir welding is a solid-state joining process that plastically moves material of the first workpiece and second workpiece to interlock the first workpiece and second workpiece at a microstructural level. In some embodiments, the first workpiece and second workpiece are the same material. For example, the first workpiece and the second workpiece may be both a AA 6065 aluminum alloy. In other embodiments, the first workpiece and second workpiece are different materials. For example, the first workpiece may be a single-phase aluminum alloy, and the second workpiece may be a single-phase copper alloy. In other examples, the first workpiece is an AA 6063 aluminum alloy and the second workpiece is an AA 7075 aluminum alloy.

In yet another embodiment, stir welding by FSP includes friction stirring of a first workpiece and a second workpiece adjacent one another in a lap joint. The FSP tool may be positioned contacting a surface of the first workpiece and the FSP tool may be plunged into the first workpiece and, optionally, the second workpiece to plastically move first workpiece material and second workpiece material to interlock the first workpiece and the second workpiece at the lap joint.

In some embodiments, a lap joint weld by FSP may require greater axial loads than a butt joint weld. The increased axial load may generate greater thermal energy and greater flow of material when a non-cutting FSP bit is used to displace workpiece material.

In some embodiments, the FSP tool has a bit coupled to a holder. The bit 114 may be rotationally fixed relative to a portion of the holder, such that rotation of, for example, a driver of the holder by an FSP system rotates the FSP bit. In some embodiments, the bit is axially fixed relative to the holder, such that axial movement of the holder produces axial movement of the bit.

The axial compression force downward toward the workpieces may be in a range having an upper value, a lower value, or upper and lower values including any of 1,000 lbs. (4.45 kN), 2,000 lbs. (8.90 kN), 4,000 lbs. (17.8 kN), 6,000 lbs. (26.7 kN), 8,000 lbs. (35.6 kN), 10,000 lbs. (44.5 kN), 15,000 lbs. (66.8 kN), 20,000 lbs. (89.0 kN), greater than 20,000 lbs. (89.0 kN), or any values therebetween. For example, the axial force may be greater than 1,000 lbs. (4.45 kN). In other examples, the axial force may be less than 20,000 lbs. (89.0 kN). In yet other examples, the axial force may be between 1,000 lbs. (4.45 kN) and 20,000 lbs. (89.0 kN). In further examples, the axial force may be between 1,000 lbs. (4.45 kN) and 10,000 lbs. (44.5 kN). In at least one example, the axial force may be between 3,750 lbs. (16.7 kN) and 4,250 lbs. (18.9 kN), and in a particular embodiment is 4,000 lbs. (17.8 kN).

In some embodiments, the bit includes or is made of a ferrous alloy, such as tool steel, a nickel alloy (e.g., a nickel superalloy), an aluminum alloy (e.g., AA 6065), or any other material that is metallurgically compatible with the workpiece to which the FSP bit is intended to interact. For example, the bit may be metallurgically compatible with both workpieces in a butt joint. In other examples, the bit is metallurgically compatible with the bottom workpiece (i.e., the second workpiece) in a lap joint. In some embodiments, the bit has one or more coatings to improve the metallurgical compatibility of the bit and the workpiece(s). In other embodiments, the bit has one or more coatings to improve the erosion and/or wear resistance of the bit. In yet other embodiments, the bit has one or more coatings to improve the corrosion resistance of the bit.

In some embodiments, the displacement of workpiece material from the workpieces at the lap joint disturbs and flow workpiece material within the stirred zone even before any rotation of the bit and stirring of the workpiece material. Hence, penetration of the bit by displacement, in contrast to cutting, may allow for greater total movement of workpiece material, increasing the homogeneity and strength of the resulting welds.

In some embodiments, a bit is configured to rotate about a rotational axis to move workpiece material. The bit may have a pin and a shoulder. For example, the pin may facilitate penetration into the workpiece material and subsequent stirring of the workpiece material. The shoulder may be wider than the pin and may contain the workpiece material displaced by the pin and further facilitate stirring of the workpiece material. In other embodiments, the bit has a pin but lacks a shoulder.

The geometry of the bit (including the pin, the shoulder(s), or other working surfaces of the bit) may affect the axial force with which the bit is forced toward the workpiece(s) during FSP. The axial force applied will ensure the bit will plunge into the workpieces and displace material during FSP. For the FSP to complete with minimal or no defects, the axial force should be approximately constant such that the penetration depth of the bit in the workpieces is approximately constant.

In some embodiments, the holder includes a dynamically responsive biasing element. The biasing element responds to the axial load applied to the bit. In some embodiments, the biasing element compresses in response to a compression force between the bit and the workpiece. The biasing element applies an equal and opposite balancing force that urges the bit toward the workpiece. By compressing, the biasing element limits changes in axial load due to variations or imperfections in the workpiece surface. It should be understood that while a single workpiece is described, the workpiece may be or include a plurality of workpieces, such as in a lap joint, butt joint, or other joining process.

In some embodiments, an FSP system includes a support arm that positions the tool at or against the workpiece. The support arm may be part of a computer-controlled and/or computer numerical control (CNC) system that allows a user to position and/or move the tool with a high degree of precision and repeatability. However, some support arms have backlash in the motors and/or joints of the support arm that can introduce error or uncertainty in the position of the bit at the terminal end of the tool. Additionally, curved workpiece surfaces can present additional challenges to the precise position of the tool relative to the workpieces surfaces as the FSP system moves the bit along the workpiece surface. For example, the backlash or other variations in the positioning of the support arm can limit the precision of the tool location in three or six degrees-of-freedom. In other examples, the dimensions and geometry of the workpiece surface may not be known to a sufficiently high precision to map the movement of the bit to the workpiece surface. In at least one example, a non-planar workpiece may be more challenging to secure and/or support in the FSP system, such as with an anvil surface on a back surface of the workpiece, and the workpiece itself may deform downward in response to the axial force of the bit in a macro-scale outside of the stirred zone and/or heat-affected zone.

As small changes in the z-position (e.g., depth) of the bit in the workpiece can produce undesirable changes, the biasing element in the tool can provide a buffer component that reduces changes in axial force relative to changes in the z-position of the holder. In some embodiments, the biasing element has a stroke in which the bit is axially moveable relative to a body of the holder. In some embodiments, the biasing element adheres or substantially adheres to Hooke's Law within the stroke. In a conventional system, a change of 1 millimeter (mm) of z-position of the tool relative to the workpiece surface may result in a change of bit depth of 1 mm into the workpiece surface, potentially producing defects. In at least some embodiments of the present disclosure, a change of 1 mm of z-position of the holder relative to the workpiece surface changes an axial force on the bit that balances the force applied by the workpiece on the bit. In a particular example, a 1 mm change in a z-position may increase the axial force applied to the bit by 1,000 lbs. (4.45 kN), which may produce a change in bit depth of less than 1 mm.

Depending on the spring constant of the biasing element in the tool, the relationship between the displacement of the bit relative to the holder and the change in the axial force applied by the bit is adjustable. In some embodiments, the biasing element includes a spring, a compressible solid (such as a polymer bushing), a compressible liquid or gas in a piston-and-cylinder, a magnet (such as an electromagnet), or combinations thereof. In some examples, the spring may be a coil spring, a die spring, one or more Belleville springs, one or more leaf springs, or combinations thereof. In some embodiments, the spring has a single spring constant throughout a stroke of the biasing element. In some examples, the spring may be a progressive spring that has regions that exhibit different spring constants within a stroke of the biasing element. In some embodiments, the biasing element includes a first biasing element and a second biasing element in axial series with one another, where the first biasing element has a first spring constant, and the second biasing element has a second spring constant. A second spring constant that is greater than the first spring constant may allow the bit to move relative to driver with less risk of the biasing element fully compressing and damaging the biasing element or other portion of the tool.

In some embodiments, a variation in the surface of the workpiece applies a compressive force to the bit without the support arm moving the tool. The biasing element of the tool can compress, allowing the bit to move and at least partially follow the workpiece surface in the axial direction to limit and/or prevent defects in the FSP due to the variations in the workpiece surface. In some embodiments, the biasing element compresses without an increase in the bit depth in the workpiece, allowing the bit to follow the workpiece surface in the axial direction.

In some embodiments, the biasing element compresses and, while the bit depth in the workpiece increases due to the increased axial force based on the spring constant of the biasing element, the bit depth increases less than the height of the variation in the workpiece surface. For example, the workpiece surface may change in height in the axial direction of the tool by 1 mm and the change in bit depth may be less than 1 mm. A tool with a biasing element according to the present disclosure can, thereby, limit and/or prevent defects due to displacements between the workpiece surface and the tool.

In some embodiments, a variation in the surface of the workpiece reduces a compressive force to the bit without the support arm moving the tool. The biasing element of the tool can extend, allowing the bit to move and at least partially follow the workpiece surface in the axial direction to limit and/or prevent defects in the FSP due to the variations in the workpiece surface. In some embodiments, the biasing element extends without a decrease in the bit depth in the workpiece, allowing the bit to follow the workpiece surface in the axial direction.

In some embodiments, the biasing element extends and, while the bit depth in the workpiece decreases due to the reduced axial force based on the spring constant of the biasing element, the bit depth decreases less than the height of the recess in the workpiece surface. For example, the workpiece surface may change in height in the axial direction of the tool by 1 mm and the change in bit depth may be less than 1 mm. A tool with a biasing element according to the present disclosure can, thereby, limit and/or prevent defects due to displacements between the workpiece surface and the tool.

In some embodiments, the tool includes a bit and a holder, wherein the holder includes a body through which a spindle passes. The spindle is configured to rotate relative to the body 330 and rotate the bit. In some embodiments, the holder supports a driver positioned at the distal end of the spindle, which supports the bit. The driver is axially supported by the biasing element. In some embodiments, the biasing element is rotationally fixed to the spindle and rotates relative to the body. In some embodiments, the biasing element is rotationally fixed relative to the body and the spindle rotates relative to the biasing element. In some embodiments, the biasing element is not rotationally fixed to either of the body or the spindle, and the biasing element is free to rotate relative to the body and the spindle. For example, the biasing element may have a race bearing or bearing surface between the biasing element and the body and between the biasing element and the spindle. During high rotational speeds, two bearings/bearing surfaces may distribute heat and wear to increase an operational lifetime of the tool.

In some embodiments, the biasing element is located at least partially axially overlapping the spindle. For example, at least one of a distal end of the biasing element and a proximal end of the biasing element is axially between a distal spindle end and a proximal spindle end in the axial direction. In some embodiments, the biasing element is located entirely axially overlapping the spindle. For example, both of a distal end of the biasing element and a proximal end of the biasing element are axially between a distal spindle end and a proximal spindle end in the axial direction.

In some embodiments, the biasing element is coaxial with the rotational axis of the spindle. In some examples, a spring of the biasing element is positioned angularly surrounding the spindle. In some examples, a compressible material is positioned in an annulus around the spindle. In other embodiments, a plurality of biasing elements are positioned around the spindle. In some embodiments, the biasing element is rotationally symmetrical around the spindle. For example, the biasing element is substantially uniform in a rotational direction around the spindle.

In contrast to a conventional spring-loaded tool holder, a biasing element according to the present disclosure axially overlaps the spindle. A conventional spring-loaded tool holder connects to the distal end of a spindle, adding axial length to the overall tool, and limiting the applications, workpieces, and systems with which the conventional spring-loaded tool holder can work. A tool according to some embodiments of the present disclosure can shorten the total length of the tool by axially overlapping the biasing element with the spindle. In some embodiments, the stroke of the biasing element is less than a biasing element length. For example, the biasing element length may be the axial length of a spring of the biasing element or an axial length of the chamber of compressible gas in a piston-and-cylinder. In some embodiments, as the biasing element approaches complete compression (e.g., bottoming out), the biasing element may not exhibit a response according to Hooke's law. In some embodiments, within the stroke, the biasing element exhibits a response to that is substantially according to Hooke's law.

In some embodiments, the stroke is less than 75% of the biasing element length. In some embodiments, the stroke is less than 50% of the biasing element length. In some embodiments, the stroke is less than 33% of the biasing element length. Because the biasing element, in some embodiments, is axially overlapping the spindle, the biasing element length and/or the stroke may be greater than a conventional spring-loaded tool holder. In some embodiments, the stroke is greater than 15% of the biasing element length. In some embodiments, the stroke is greater than 25% of the biasing element length. In some embodiments, the stroke is greater than 50% of the biasing element length.

As described herein, a biasing element according to the present disclosure can have a greater axial length than a conventional spring-loaded tool holder by axially overlapping the spindle. In some embodiments, the biasing element length is no less than 2 inches. In some embodiments, the biasing element length is no less than 3 inches. In some embodiments, the biasing element length is no less than 4 inches.

The stroke may be greater relative to a total length of the tool and/or body of the tool than a tool holder with a conventional spring-loaded tool holder. In some embodiments, the stroke is greater than 15% of the total length of the tool. In some embodiments, the stroke is greater than 25% of the total length of the tool. In some embodiments, the stroke is greater than 50% of the total length of the tool.

Relative to a conventional spring-loaded tool holder, some embodiments of a tool according the present disclosure experiences less torque during translation across a workpiece and may exhibit less lateral bending of the tool. The tool experiences a force from the workpiece that resists the translation of the bit through the workpiece. The shorter total length of the tool (compared to a conventional tool holder) can reduce the lever arm over which the force is applied, which can further improve the precision with which the position of the bit is controlled. For example, a support arm of a CNC machine or other robotic system such as described herein can experience bending or other elastic deformation of the support arm. The farther the location of the applied force from the support arm and/or joints of the support arm, the greater the potential for deformation and/or error in the bit placement. A more compact device can improve precision and accuracy with an FSP system.

In some embodiments, the biasing element may be preloaded to limit the amount of compression of the biasing element that is needed to achieve operational axial forces. For example, a tool that is intended for FSP under axial forces of 2,000 lbs. (8.90 kN) to 10,000 lbs. (44.5 kN) may have a preload of the biasing element of 2,000 lbs. (8.90 kN). In such an example, an axial force applied to the workpiece that is less than the preload would not produce any compression of the biasing element, and the bit remains in the same axial position relative to the body. As the FSP system applies greater force to the workpiece, the bit may displace axially relative to the body, allowing both compression and extension of the biasing element during FSP of the workpiece. In some embodiments, the preload of the biasing element is in a range having an upper value, a lower value, or upper and lower values including any of 1,000 lbs. (4.45 kN), 2,000 lbs. (8.90 kN), 4,000 lbs. (17.8 kN), 6,000 lbs. (26.7 kN), 8,000 lbs. (35.6 kN), 10,000 lbs. (44.5 kN), 15,000 lbs. (66.8 kN), 20,000 lbs. (89.0 kN), greater than 20,000 lbs. (89.0 kN), or any values therebetween. For example, the preload may be greater than 1,000 lbs. (4.45 kN). In other examples, the preload may be less than 20,000 lbs. (89.0 kN). In yet other examples, the preload may be between 1,000 lbs. (4.45 kN) and 20,000 lbs. (89.0 kN). In further examples, the preload may be between 1,000 lbs. (4.45 kN) and 10,000 lbs. (44.5 kN). In at least one example, the preload may be between 3,750 lbs. (16.7 kN) and 4,250 lbs. (18.9 kN), and in a particular embodiment is 4,000 lbs. (17.8 kN).

In some embodiments, a sensor measures an axial force applied to the bit. In some embodiments, the sensor is a force sensor configured to measure the axial force directly. In some embodiments, the sensor is a strain gauge configured to measure the axial force indirectly. In some embodiments, the sensor is a displacement sensor configured to measure a displacement of at least a portion of the biasing element. For example, a displacement sensor may measure a compression and/or extension of the biasing element to measure an axial force applied on the biasing element by the bit.

In some embodiments, a bit has a non-planar tip. In some embodiments, the bit design and/or geometry can further allow the bit to follow a workpiece surface by limiting bit penetration and allowing the biasing element to compress.

In some embodiments, the bit has a generally conical pin and substantially flat shoulder. In the same or other embodiments, a curved transition may be positioned between the pin and the adjacent shoulder to direct workpiece material flow to the shoulder. In other embodiments, the bit has a pin and lacks a shoulder. In yet other embodiments, the pin has a face with one or more surface features thereon to engage with the workpiece material and increase flow of the workpiece material around the bit.

In some embodiments, a pin includes one or more surface features to increase the movement of workpiece material during rotation of the pin. For example, a pin may have a spiral surface feature to urge material in the stirred zone to circulate toward the radial center of the stirred zone instead of displacing radially away from the FSP bit. Such a pin surface feature may be beneficial in a lap joint friction stir weld to reduce and/or prevent thinning of the workpiece material in the weld zone. The spiral pin surface feature in combination with the angle of a linear portion and/or curved portion of the pin profile, may circulate workpiece material downward toward within the stirred region, as well. Such a surface feature may be beneficial in a lap friction stir weld to encourage stirred workpiece material from the first workpiece toward the second workpiece to form the lap joint.

The pin may have a pin height that is relative to the shoulder height. In some embodiments, the pin height is a percentage of the shoulder height in a range having an upper value, a lower value, or upper and lower values including any of 50%, 60%, 70%, 80%, 90%, 100%, 110%, 120%, 130%, 140%, 150%, greater than 150%, or any values therebetween. For example, the pin height may be greater than 50% of the shoulder height. In other examples, the pin height may be less than 150% of the shoulder height. In yet other examples, the pin height may be between 50% and 150% of the shoulder height. In further examples, the pin height may be between 75% and 125% of the shoulder height.

In some embodiments, the pin has a pin height that is relative to a bit height. The pin height may be in a range having an upper value, a lower value, or an upper and lower value including any of 5%, 10%, 15%, 20%, 25%, 30%, 40%, 45%, 50%, 60%, 70%, 80%, 90%, 100% of the bit height, or any values therebetween. For example, the pin height may be greater than 10% of the bit height. In another example, the pin height may be greater than 25% of the bit height. In yet another example, the pin height may be greater than 50% of the bit height.

In some embodiments, the pin has a pin height in the longitudinal direction that is relative to a total diameter of the bit. The pin height may be in a range having an upper value, a lower value, or an upper and lower value including any of 5%, 10%, 15%, 20%, 25%, 30%, 40%, 45%, 50%, 60%, 70%, 80%, 90%, 100% of the total diameter, or any values therebetween. For example, the pin height may be greater than 5% of the total diameter. In another example, the pin height may be less than 100% of the total diameter. In yet another example, the pin height may be between 10% and 50% of the total diameter. In at least one example, the pin height may be between 15% and 35% of the total diameter.

In other embodiments, the bit has a bit height that is related to the total diameter. The bit height may be in a range having an upper value, a lower value, or an upper and lower value including any of 5%, 10%, 15%, 20%, 25%, 30%, 40%, 45%, 50%, 60%, 70%, 80%, 90%, 100% of the total diameter, or any values therebetween. For example, the bit height may be greater than 5% of the total diameter. In another example, the bit height may be less than 100% of the total diameter. In yet another example, the bit height may be between 10% and 50% of the total diameter. In a further example, the bit height may be between 25% and 40% of the total diameter. In at least one specific example, the bit height may be greater than 100% of the total diameter, such as when joining thick workpieces and/or the site of the FSP placement has relatively small lateral clearance.

In some embodiments, the pin has a pin profile that is at least partially linear. In other embodiments, the pin has a pin profile that is at least partially curved. In yet other embodiments, the pin has a pin profile with a portion that is curved and a portion that is linear.

The bit may have a non-cutting tip that allows the bit to penetrate a workpiece by displacing workpiece material without cutting the workpiece material. In some embodiments, the bit has a tip that is rounded. In other embodiments, the tip may be pointed. In yet other embodiments, the tip is planar and the face is optionally angled, such that the pin is frustoconical. In further embodiments, the tip is planar across a pin diameter, such that the pin is substantially cylindrical. In at least one embodiment, the tip includes at least one pilot feature to assist in engaging with and penetrating into the workpiece material.

In other embodiments, the tip is a cutting tip that includes one or more cutting features to accelerate penetration into the workpiece material. The cutting features may cut a pilot hole with a diameter less than a pin diameter, such that the pin displaces workpiece material radially outside the pilot hole. For example, the cutting features may cut a pilot hole with a diameter 50% of the pin diameter, and the face of the pin may displace workpiece material outside of the pilot hole.

In some embodiments, the pin has a pin diameter that is related to the total diameter of the bit. For example, the pin diameter may be a percentage of the total diameter in a range having an upper value, a lower value, or an upper and lower value including any of 5%, 10%, 15%, 20%, 25%, 30%, 40%, 45%, 50%, 60%, 70%, 80%, 90%, 100%, or any values therebetween. For example, the pin diameter may be greater than 5% of the total diameter. In another example, the pin diameter may be less than 100% of the total diameter. In yet another example, the pin diameter may be between 10% and 90% of the total diameter. In at least one example, the pin diameter may be between 25% and 75% of the total diameter.

In some embodiments, the pin has a face angle between a face of the pin and the rotational axis that is in a range having an upper value, a lower value, or upper and lower values including any of 30°, 40°, 45°, 50°, 60°, 75°, 80°, 85°, 90°, or any values therebetween. For example, a face may be oriented at a face angle greater than 30°. In other examples, the face is oriented at a face angle less than 90°. In yet other examples, the face is oriented a face angle between 30° and 90°. In further examples, the face is oriented at a face angle between 45° and 80°. In at least one example, the face is oriented at a face angle of 60° to the rotational axis. In at least another example, the face is oriented at a face angle that is non-perpendicular to the rotational axis.

A method of FSP, in some embodiments according to the present disclosure, allows the bit to react to changes in the workpiece surface without the support arm or other device moving the tool holder in a z-direction relative to the workpiece. In some embodiments, a method of FSP including applying an axial force to a workpiece with a bit and rotating the bit with a tool holder, such as described herein. The bit may soften the workpiece and plunge into the workpiece before the method includes translating the bit through a stirred zone of the workpiece.

In some embodiments, the method includes compressing a biasing element in a body of the tool holder to allow the axial force to change in response to the relative position of the tool holder and the workpiece surface. While translating the bit through the stirred zone of the workpiece, the method further includes moving the bit in a z-direction based at least partially on a biasing force of the biasing element and a change in a height of the workpiece surface, such as described herein. In some embodiments, moving the bit in a z-direction includes moving the bit relative to a body of the tool holder. For example, the biasing element may compress to allow the bit to move closer to the body of the tool and/or in a first z-direction. In some examples, the biasing element may extend to allow the bit to move further from the body of the tool and/or in a second z-direction.

In some embodiments, systems and methods of friction stir processing according to the present disclosure are related to any of the sections below:

[A1] In some embodiments, a device for friction stirring a workpiece material includes a body, a spindle, a driver, and a biasing element. The spindle is configured to rotate around a rotational axis. The driver is rotationally coupled to the spindle. The biasing element supports the driver and is configured to apply a biasing force in an axial direction, wherein the biasing element axially overlaps the spindle.

[A2] In some embodiments, the biasing element of [A1] is radially and axially within the body.

[A3] In some embodiments, the biasing element of [A1] or [A2] is entirely axially overlapping the spindle.

[A4] In some embodiments, the biasing element of any of [A1] through [A3] is rotationally symmetrical around the rotational axis.

[A5] In some embodiments, the biasing element of any of [A1] through [A4] includes a coil spring.

[A6] In some embodiments, the coil spring of [A5] is a die spring.

[A7] In some embodiments, the biasing element of any of [A1] through [A4] includes a gas piston-and-cylinder.

[A8] In some embodiments, a biasing element length of the biasing element of any of [A1] through [A7] is no less than 50% of a total length of the device.

[A9] In some embodiments, the device of any of [A1] through [A8] has a stroke in which a bit can move relative to the body, and the stroke is less than 50% of a biasing element length of the biasing element.

[A10] In some embodiments, the stroke of [A9] is greater than 10% of the biasing element length of the biasing element.

[A11] In some embodiments, the biasing element of any of [A1] through [A10] is no less than 2 inches in biasing element length.

[A12] In some embodiments, the device of any of [A1] through [A11] includes a sensor to measure an axial load on the biasing element.

[A13] In some embodiments, the sensor of [A12] is configured to measure a displacement of the biasing element.

[A14] In some embodiments, the biasing element of any of [A1] through [A13] has a 2,000 lbs. preload.

[B1] In some embodiments, a system for friction stir processing includes a support arm including at least one joint and a friction stir processing device positioned at an end of the support arm. The friction stir processing device includes a body, a spindle, a driver, and a biasing element. The spindle is configured to rotate around a rotational axis. The driver is rotationally coupled to the spindle. The biasing element supports the driver and is configured to apply a biasing force in an axial direction, wherein the biasing element axially overlaps the spindle.

[B2] In some embodiments, the support arm of [B1] is part of a computer numerical control (CNC) device.

[B3] In some embodiments, the support arm of [B1] or [B2] includes at least two joints.

[B4] In some embodiments, the support arm of any of [B1] through [B3] provides six degrees of freedom of movement.

[C1] In some embodiments, a method of friction stir processing includes applying an axial force to a workpiece with a bit; rotating the bit relative to the workpiece with a tool holder; translating the bit through a stirred zone of the workpiece; compressing a biasing element in a body of the tool holder; and, while translating the bit through a stirred zone of the workpiece, moving the bit in a z-direction based at least partially on a biasing force and a change in a height of a surface of the workpiece.

[C2] In some embodiments, moving the bit in a z-direction includes moving the bit relative to a body of a tool holder.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, unless such features are mutually exclusive. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for friction stirring a workpiece material, the device comprising:
   a body;
   a spindle configured to rotate around a rotational axis relative to the body;
   a driver rotationally coupled to the spindle; and
   a biasing element supporting the driver and configured to apply a biasing force in an axial direction between the body and the driver, wherein the biasing element axially overlaps at least a portion of the spindle and is rotatable relative to the spindle.

2. The device of claim 1, wherein the biasing element is radially and axially within the body.

3. The device of claim 1, wherein the biasing element is completely axially overlapping the spindle.

4. The device of claim 1, wherein the biasing element is rotationally symmetrical around the rotational axis.

5. The device of claim 1, wherein the biasing element includes a coil spring.

6. The device of claim 5, wherein the coil spring is a die spring.

7. The device of claim 1, wherein the biasing element includes a gas piston-and-cylinder.

8. The device of claim 1, wherein the device has a stroke in which a bit can move relative to the body, and the stroke is greater than 15% of the total length of the device.

9. The device of claim 1, wherein the device has a stroke in which a bit can move relative to the body, and the stroke is less than 50% of a biasing element length of the biasing element.

10. The device of claim 9, wherein the stroke is greater than 10% of the biasing element length of the biasing element.

11. The device of claim 1, wherein the biasing element is no less than 2 inches in biasing element length.

12. The device of claim 1, further comprising a sensor to measure an axial load on the biasing element.

13. The device of claim 12, wherein the sensor is configured to measure a displacement of the biasing element.

14. The device of claim 1, wherein the biasing element has a 2,000 pounds preload.

15. A system for friction stir processing, the system comprising:
    a support arm including at least one joint; and
    a friction stir processing device positioned at an end of the support arm, wherein the friction stir processing device includes:
    a body,
    a spindle configured to rotate around a rotational axis,
    a driver rotationally coupled to the spindle, and
    a biasing element supporting the driver and configured to apply a biasing force in an axial direction between the body and the driver, wherein the biasing element axially overlaps the spindle and is rotatable relative to the spindle.

16. The system of claim 15, wherein the support arm is part of a computer numerical control (CNC) device.

17. The system of claim 15, wherein the support arm includes at least two joints.

18. The system of claim 15, wherein the support arm provides six degrees of freedom of movement.

* * * * *